United States Patent [19]
Morris

[11] Patent Number: 5,074,121
[45] Date of Patent: Dec. 24, 1991

[54] AIR CONDITIONING INSTALLATION FOR AN AUTOMOTIVE VEHICLE

[75] Inventor: Paul W. Morris, Llwynwhiling, United Kingdom

[73] Assignee: Valeo, Paris, France

[21] Appl. No.: 593,007

[22] Filed: Oct. 5, 1990

[30] Foreign Application Priority Data
Oct. 9, 1989 [FR] France ................... 89 13167

[51] Int. Cl.⁵ ............................ F25D 17/06
[52] U.S. Cl. ..................... 62/173; 62/176.4; 62/274; 62/244
[58] Field of Search ............ 62/90, 93, 92, 173, 62/176.1, 176.4, 274, 244; 236/44 B

[56] References Cited

U.S. PATENT DOCUMENTS

| | | | |
|---|---|---|---|
| 3,415,313 | 12/1968 | Olstad | 62/90 X |
| 3,761,019 | 9/1973 | Delic | 237/12.3 |
| 4,118,209 | 10/1978 | Exler et al. | 62/90 X |
| 4,135,370 | 1/1979 | Hosoda et al. | 62/92 X |
| 4,346,048 | 8/1982 | Gates | 261/130 |
| 4,424,933 | 1/1984 | Sutoh et al. | 236/44 A |
| 4,494,384 | 1/1985 | Lott | 62/279 |

FOREIGN PATENT DOCUMENTS 0280942 9/1988 European Pat. Off. .
2469304 5/1981 France .

OTHER PUBLICATIONS

Patent Abstracts of Japan, vol. 11, No. 318, Oct. 1987, JP 62-102042.
Patent Abstracts of Japan, vol. 5, No. 76, May 1981, JP 56-25012.
Patent Abstracts of Japan, vol. 8, No. 258, Nov. 1984, JP 59-130722.

Primary Examiner—William E. Tapolcai
Attorney, Agent, or Firm—Dennison, Meserole, Pollack & Scheiner

[57] ABSTRACT

An air conditioning installation for an automotive vehicle includes an evaporator through which a stream of air to be treated passes. This air stream is cooled in the evaporator, which extracts humidity from it and forms a condensate. The installation also includes a radiator-type main heating device for heating the cooled air if necessary, and provides a stream of treated air for delivery into the cabin of the vehicle. The installation further comprises a condensate reservoir for collecting the condensate produced by the evaporator; heating means for heating this condensate to form water vapor; and injection means for injecting this water vapor in a controlled manner into the treated air stream downstream of the main heating device. In this way, the humidity of the treated air can be regulated.

10 Claims, 1 Drawing Sheet

AIR CONDITIONING INSTALLATION FOR AN AUTOMOTIVE VEHICLE

FIELD OF THE INVENTION

This invention relates to an air conditioning installation for an automotive vehicle.

BACKGROUND OF THE INVENTION

Air conditioning installations are already known which include an evaporator which is adapted for a stream of air to be treated to pass through it, and to cool the said air stream and extract the humidity from it, with formation of a condensate, the installation further including a heating device for heating the cooled air stream as required, so as to provide a stream of treated air for delivery into the cabin of the vehicle. Such an installation will be referred to herein as an installation of the kind specified.

An installation of this kind is known in particular from French patent application No. 80-23807, published under the number 2 469 304, in which means are also provided for preventing icing of the evaporator, while allowing it to operate at its maximum refrigerating capacity. In known installations of that type, a stream of cooled air is obtained at the outlet of the evaporator. The humidity of this cooled air stream depends on its temperature, i.e. the lower the temperature the lower the humidity. Humidity which is thus extracted from the air stream as it passes through the evaporator forms a condensate which is simply evacuated below the vehicle. The cooled air stream, having a low humidity, then passes through the heating device, so as to bring it to the desired temperature. However, its humidity remains unchanged.

In such known installations, the evaporator is part of the refrigeration circuit through which a refrigerant fluid circulates. The refrigerant circuit also includes a condenser. The heating device commonly consists of a heat exchanger through which the engine cooling fluid of the vehicle circulates. As the evaporator operates at its maximum refrigerating capacity, it follows that the stream of treated air has a very low humidity regardless of its temperature, since regulation of its temperature does not change its degree of humidity.

Such known installations therefore have the major drawback of producing a stream of treated air the humidity of which is not only much too low, but cannot be adjusted at will.

DISCUSSION OF THE INVENTION

A principal object of the invention is to overcome the above disadvantage.

According to the invention, in an installation of the kind specified, the said heating device is a first heating means in the form of a radiator, and the installation further includes a reservoir for collecting the condensate from the evaporator, further heating means for heating this condensate and for forming water vapour, and injection means for injecting the said water vapour in a controlled manner into the stream of treated air downstream of the first heating means, which enables the humidity of the treated air stream to be regulated.

In an installation according to the invention, water vapour can thus be injected in a controlled manner into the stream of heated air, which allows the humidity of the latter to be regulated and leads to improved comfort for the occupants of the vehicle.

Preferably, the injection means for injecting the water vapour include an injection pump supplying at least one atomising nozzle which is located downstream of the first heating means.

Preferably, the injection pump is controlled by a control microprocessor in response to the temperature of the water vapour downstream of the reservoir and in response to the degree of humidity in the stream of treated air downstream of the first heating means. With this arrangement, the control microprocessor is connected to a vapour temperature sensor located at the outlet of the condensate reservoir, being also connected to a humidity sensor which is located downstream of the first heating means.

Preferably, the heating means for the condensate are arranged to use the heat in the exhaust gases from the engine of the automotive vehicle or the heat from a turbo compressor associated with the engine. However, these heating means may take any other suitable form, for example an electrical resistance heater which is arranged in the condensate reservoir.

The installation preferably includes a condensate recuperation sump arranged below the evaporator and connected to the condensate reservoir. This recuperation sump may be connected directly to the condensate reservoir. However, in a preferred embodiment of the invention, the condensate recuperation sump is connected to the condensate reservoir through a conduit having a branch leading to an auxiliary condensate reservoir for receiving surplus condensate.

Thus, in an air conditioning installation of this type in accordance with the invention, in which the evaporator is part of a refrigeration circuit through which a refrigerant fluid circulates and also including a condenser, the auxiliary reservoir is connected to an outlet conduit which is adapted to convey the condensate on to the condenser so as to cool the latter. This improves the efficiency of the refrigeration circuit.

The description of a preferred embodiment of the invention, given below, is by way of example only and with reference to the accompanying drawings.

DESCRIPTION OF A PREFERRED EMBODIMENT OF THE INVENTION

Figure 1:
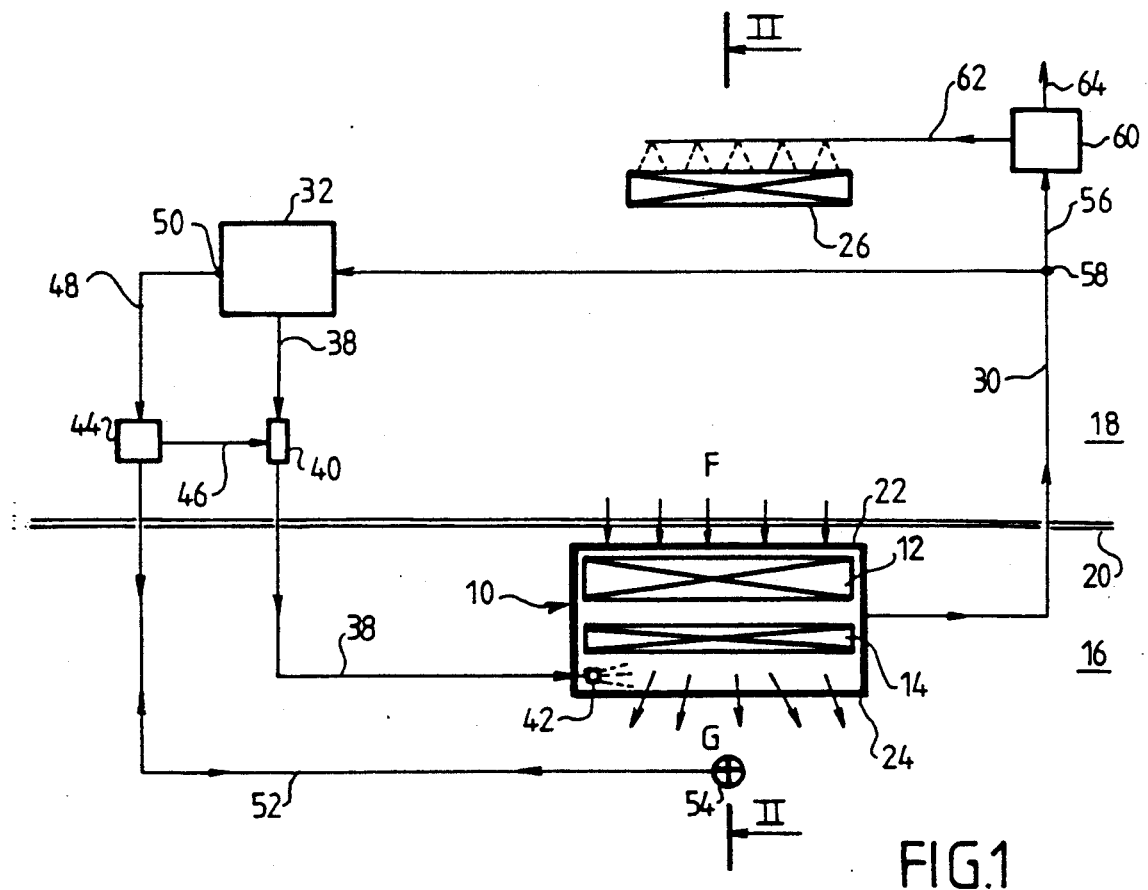
FIG. 1 is a diagrammatic representation of an air conditioning installation in accordance with the preferred embodiment of the invention mentioned above.
Figure 2:
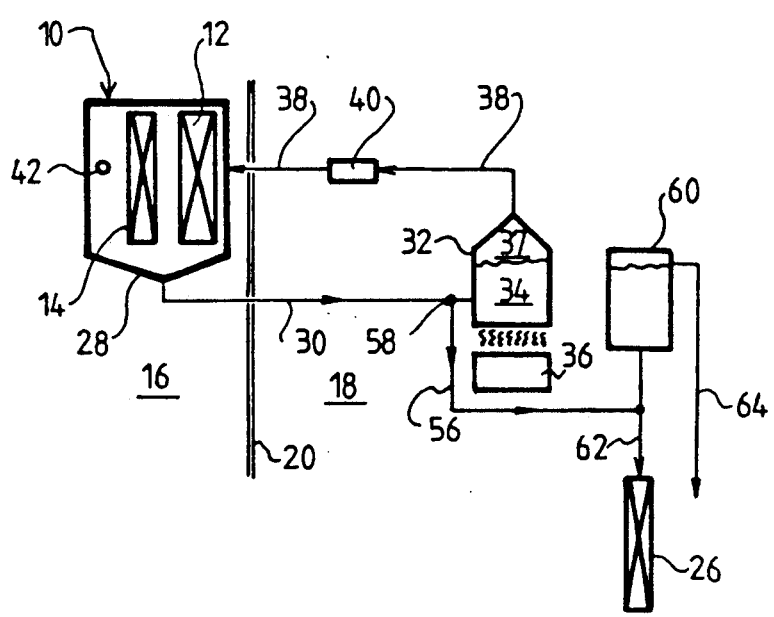
FIG. 2 is a diagrammatic cross sectional view taken on the line II—II in FIG. 1.

The air conditioning installation shown in FIGS. 1 and 2 includes a housing 10 containing an evaporator 12 and a heating device 14. The housing 10 is mounted in the cabin 16 of an automotive vehicle, the cabin 16 being separated from the engine compartment 18 by means of a bulkhead 20.

The housing 10 includes an inlet 22 which is adapted to receive a stream of air which is to be treated, as indicated by the arrows F. The housing 10 also has an outlet 24 through which a stream of heated or conditioned air escapes into the cabin 16 as indicated by the arrows G.

The stream of air to be treated consists of air which is taken from outside the vehicle, and/or recycled air taken from within the cabin 16. The treated air stream is delivered into the cabin 16 through appropriate ducts and vents. The stream of air to be treated first passes through the evaporator 12, in which it is cooled, and in which humidity is extracted from the air, so forming a condensate. The cooled air stream, now having a very low humidity, then passes through the heating device 14 in which it is heated if necessary, so as to adjust the temperature of the conditioned (treated) air stream which escapes through the outlet 24 of the housing 10.

The evaporator 12 is part of a refrigeration circuit (not shown), which also includes a condenser 26. A refrigerant fluid circulates in the refrigeration circuit in the conventional way. The heating device 14 is preferably a heat exchanger in the form of a heat radiator, through which the engine cooling fluid of the vehicle circulates. The housing 10, with its evaporator 12 and heating device 14, to the extent that they have been described up to this point, constitute an air conditioning unit of a conventional type.

However, at the base of the housing 10, the latter includes a recuperation sump 28 which is funnel-shaped. The sump 28 is arranged to recover the condensate which results from the extraction of the humidity from the cooled air stream passing through the evaporator 12.

The installation also includes a conduit 30 which connects the recuperation sump 28 to a reservoir 32 which is adapted to recover the condensate from the evaporator 12, previously collected in the sump 28. The condensate, 34, which is collected in the reservoir 32 is heated by a further heating means 36 (FIG. 2), which preferably takes heat from the exhaust gases leaving the engine of the vehicle. Alternatively, it may draw heat from a turbo compressor associated with the engine. In another modification, the heating means 36 may comprise an electrical resistance heater submerged in the condensate 34 within the reservoir 32.

The heating means 36 cause water vapour 37 to be formed. This vapour 37 escapes through an outlet in the top of the reservoir 32 via a conduit 38 in which an injection pump 40 is fitted. The injection pump 40 feeds the water vapour to at least one atomising nozzle 42, which is located in the housing 10 downstream of the heating device 14 and upstream of the outlet 24 of the housing 10. The atomising nozzle 42 thus enables water vapour to be injected in a controlled manner into the treated air stream downstream of the heating device 14, so that the amount of humidity in the treated air stream can be controlled at will.

The injection pump 40 is controlled by a control microprocessor 44, via a transmission line 46. The control microprocessor 44 is connected through a line 48 to a temperature sensor 50 which is located at the outlet of the reservoir 32. The temperature sensor 50 is such as to detect the temperature of the water vapour 37 resulting from the heating of the condensate 34 in the reservoir 32. The control microprocessor 44 is also connected through a line 52 to a humidity sensor 54 which is located downstream of the heating device 14. The humidity sensor 54 is such as to detect the degree of humidity in the treated air stream which is delivered from the housing 10. The injection pump 40 is thus controlled by the control microprocessor 44 in response to the temperature of the water vapour downstream of the condensate reservoir 32, and also in response to the amount of humidity in the treated air stream downstream of the heating device 14.

In accordance with the present invention, it is preferred to arrange for the evaporator 12 to operate at its maximum refrigerating capacity, which enables a cold and nearly dry air stream to be obtained at the evaporator outlet. This stream of cold dry air is then reheated as required by the heating device 14, so as to adjust its temperature to the required value. The atomising nozzle 42 then enables an adjustable quantity of humidity to be added to the treated air stream so that the humidity of the latter can be adjusted as required as a function of the desired conditions. The control microprocessor 42 may be designed and programmed in a number of different ways, according to the operating requirements.

Although the conduit 30 may connect the recuperation sump 28 directly to the reservoir 32, in a preferred arrangement shown in FIG. 1, a branch 56 is provided in the conduit 30. This branch 56 is connected to the conduit 30 at a junction point 58. A valve (not shown) can be mounted at the junction point 58, to control diversion of condensate into the branch 56, so as to supply a proportion or surplus of the condensate via the branch 56 to an auxiliary reservoir 60. The auxiliary reservoir 60 is connected to an outlet conduit 62, which is arranged to deliver condensate to the condenser 26 of the refrigeration circuit, in order to cool it and improve its efficiency, in the manner suggested by U.S. Pat. No. 4,579,090. In addition, a conduit 64 issuing from the top of the auxiliary reservoir 60, is arranged to evacuate the excess of condensate underneath the vehicle.

The valve at the junction point 58 may be controlled by a float in the reservoir 32. Thus, as the level of the condensate 34 in the reservoir 32 falls below a predetermined threshold value, the condensate is delivered only to the reservoir 32. On the other hand, when the level of the condensate 34 reaches this threshold value, the float actuates the valve so as to divert the surplus condensate to the auxiliary reservoir 60. This surplus condensate can then be used for cooling the condenser 26 as described above.

The installation of the invention is of course capable of numerous modifications, especially in connection with the design of the control microprocessor 44 which controls the injection pump 40.

What is claimed is:

1. An air conditioning installation for an automotive vehicle having an engine which rejects waste heat and a cabin, wherein the installation includes inlet means for an untreated air stream, outlet means into the cabin for a treated air stream, an air conditioning system including an evaporator, a condenser and a compressor operating in a closed loop, said evaporator being downstream of the said inlet means, and a first heating means in the form of a radiator supplied with waste heat from said engine located downstream of the evaporator, so that the air stream is cooled and dried in the evaporator with formation of a condensate, and is then heated by the first heating means as required, the installation further including: a condensate reservoir; means for conveying the said condensate from the evaporator to the condensate reservoir for its collection in the latter; second heating means associated with the condensate reservoir for heating the condensate therein and for forming water vapour, the condensate reservoir having an outlet for the said water vapour, injection means connected with the said water vapour outlet for injecting the said water vapour in a controlled manner into the said air stream downstream of the said first heating means, and control means responsive to humidity at said outlet means for controlling said injection means, whereby the humidity of the air stream at the said air outlet means can be regulated.

2. An installation according to claim 1, further comprising an atomising nozzle arranged downstream of the first heating means, the water vapour injection means including an injection pump and means connecting the injection pump with the atomising nozzle for supply of the said water vapour to the latter by the former.

3. An installation according to claim 1, wherein the said second heating means are associated with said engine of the vehicle for extracting heat from the engine exhaust gases or from a turbo compressor associated with the engine.

4. An installation according to claim 1, further comprising a condensate recuperation sump arranged below the evaporator, with means connecting the said sump to the said condensate reservoir.

5. An installation according to claim 4, wherein the means connecting the condensate recuperation sump to the condensate reservoir connect them together directly.

6. An installation according to claim 4, further comprising a conduit connecting the said condensate recuperation sump with the condensate reservoir, an auxiliary condensate reservoir, a branch of the said conduit connecting the said conduit with the auxiliary condensate reservoir, and means for diverting to the latter any surplus condensate.

7. An installation according to claim 4, further comprising a housing containing the evaporator and the first heating means, the said recuperation sump constituting the base of the said housing.

8. An installation according to claim 6 including an outlet conduit connected between said auxiliary condensate reservoir and said condenser of said air conditioning system for delivering condensate from the auxiliary reservoir to the condenser whereby to cool the latter.

9. An air conditioning installation for an automotive vehicle having a cabin, wherein the installation includes inlet means for an untreated air stream, outlet means into the cabin for a treated air stream, an evaporator downstream of the said inlet means, and a first heating means in the form of a radiator downstream of the evaporator, so that the air stream is cooled and dried in the evaporator with formation of a condensate, and is then heated by the first heating means as required, the installation further including: a condensate reservoir; means for conveying the said condensate from the evaporator to the condensate reservoir for its collection in the latter; second heating means associated with the condensate reservoir for heating the condensate therein and for forming water vapour, the condensate reservoir having an outlet for the said water vapour, injection means connected with the said water vapour outlet for injecting the said water vapour in a controlled manner into the said air stream downstream of the said first heating means, an atomizing nozzle arranged downstream of the first heating means, said water vapour injection means including an injection pump and means connecting the injection pump with the atomizing nozzle for supply of the water vapour to the latter by the former whereby the humidity of the air stream at the said air outlet means can be regulated; and a control microprocessor, water vapour temperature sensing means downstream of the condensate reservoir, and humidity sensing means downstream of the said first heating means, the control microprocessor being connected with the injection pump and with the said temperature and humidity sensing means, whereby to control the injection pump as a function of the said temperature and humidity.

10. An installation according to claim 9, wherein the water vapour temperature sensing means comprises a vapour temperature sensor at an outlet of the condensate reservoir, the said humidity sensor being disposed downstream of the said first heating means.

* * * * *